United States Patent [19]
Song

[11] Patent Number: 5,475,437
[45] Date of Patent: Dec. 12, 1995

[54] DOUBLE SCAN CIRCUIT FOR INSERTING A NEW SCAN LINE BETWEEN ADJACENT SCAN LINES OF A TELEVISION

[75] Inventor: Kwang-sub Song, Suwon, Rep. of Korea

[73] Assignee: Samsung Electronics Co., Ltd., Kyungki-do, Rep. of Korea

[21] Appl. No.: 326,941

[22] Filed: Oct. 21, 1994

[30] Foreign Application Priority Data

Oct. 23, 1993 [KR] Rep. of Korea .................. 93-21873

[51] Int. Cl.⁶ .................. H04N 7/01; H04N 5/262
[52] U.S. Cl. .................. 348/448; 348/441; 348/561; 345/130; 345/200
[58] Field of Search .................. 348/448, 450, 348/449, 441, 458, 561, 562, 581, 582, 705, 706, 240, 584, 598, 500, 537, 536, 443, 445, 444, 447, 451, 452; 345/127, 130, 196, 201, 200; 395/102, 115, 109; 358/451, 447, 445; 382/54, 55; H04N 7/01, 5/262, 5/265

[56] References Cited

U.S. PATENT DOCUMENTS

4,573,080 2/1986 Maze .................. 348/448
4,605,962 8/1986 Christopher et al. .................. 348/448
4,825,288 4/1989 Chantelou .................. 348/448
4,868,656 9/1989 Geiger et al. .................. 348/448
4,959,715 9/1990 Prodan .................. 348/448
5,115,312 5/1992 Shim .................. 348/441
5,177,609 1/1993 Kawakami et al. .................. 348/458

*Primary Examiner*—Safet Metjahic
*Attorney, Agent, or Firm*—Sughrue, Mion, Zinn, Macpeak & Seas

[57] ABSTRACT

A double scan circuit has first and second data converters for converting n-bit real line data and n-bit interpolated line data into 2n-bit data; first and second RAMs in which the real line data and the interpolated line data are stored, respectively; a memory controller for generating a write/read control signal for the first and the second RAMs, a write address and a read address whose speed is double that for the write address, for outputting them to the first and second RAMs, and for generating a mixing control signal for mixing the original line data and the interpolated line data stored in the first and second RAMs for double scanning; and a multiplexer for selecting one between the 2n-bit real line data and the 2n-bit interpolated line data generated from the first and second RAMs in accordance with the mixing control signal and the real/interpolated line control signal and for producing the selected one as n-bit double scan data. This circuit facilitates VLSI implementation compared with a conventional double scan circuit using FIFO-type memories.

10 Claims, 5 Drawing Sheets

DOUBLE SCAN CIRCUIT FOR INSERTING A NEW SCAN LINE BETWEEN ADJACENT SCAN LINES OF A TELEVISION

BACKGROUND OF THE INVENTION

The present invention relates to a double scan circuit, and more particularly, to a double scan circuit for inserting a new scan line obtained by interpolating adjacent interlacing scan lines into the space between lines and scanning the lines at double speed in a television.

A double scan method is generally used to maintain the resolution of an image when the screen size of a television set is increased. According to the double scan method, a television repeatedly scans the respective pixels of the screen (or the respective points on the scan line) with the same image information, so as to improve the visibility of the screen.

Figure 1:
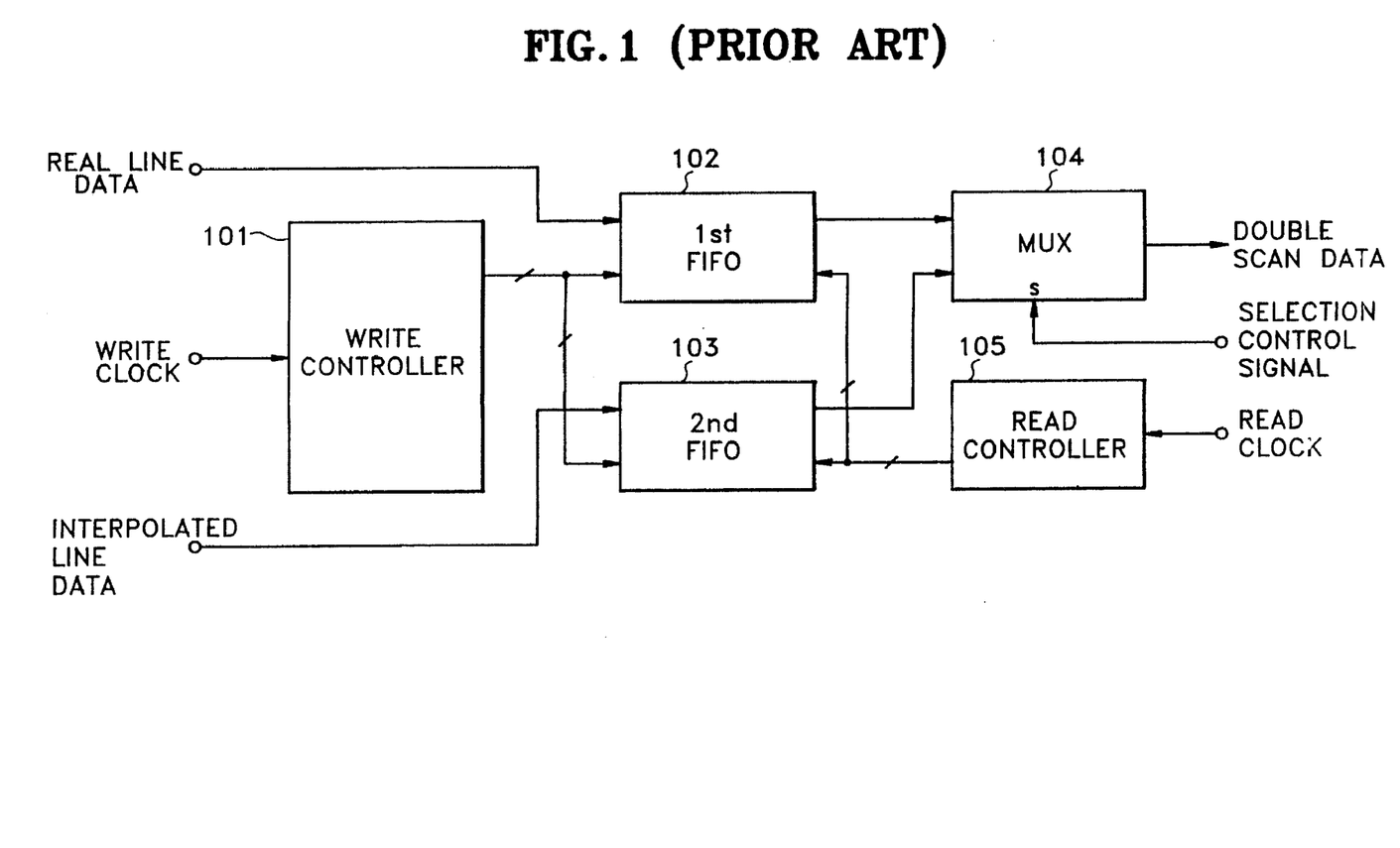
FIG. 1 is a block diagram of a conventional double scan circuit.

An example of a conventional technology for double scanning is shown in FIG. 1, showing the constitution of the technology currently used. For double scanning, the speed for a reading operation must be twice that for a writing operation. First-in-first-out (FIFO) line memories are generally used to accomplish this.

When scanning using a FIFO line memory, the reading speed must be twice the writing speed. For this, first and second FIFO line memories 102 and 103 are controlled by a write controller 101 and a read controller 105.

Write controller 101 counts the pulses of the write clock and produces a write address signal for first and second FIFO line memories 102 and 103. Read controller 105 counts the pulses of the read clock and produces a read address signal for first and second FIFO line memories 102 and 103.

In accordance with a write starting pulse and the write clock generated from write controller 101, the real line data (original line data) is input to the first FIFO line memory 102. Also, the interpolated line data is input to the second FIFO line memory 103. The data input to the first and second FIFO line memories 102 and 103 is read out in accordance with the control of read controller 105.

In other words, when reading out the data recorded in the first and the second FIFO line memories 102 and 103, control is performed by read controller 105 and is independent of the write control. Read controller 105 generates a read starting pulse according to the read clock whose frequency is double that for write control, and applies it to first and second FIFO line memories 102 and 103. Read controller 105 reads out the original data of first FIFO line memories 102 and the interpolated data of second FIFO line memories 103, in the same order as that for recording and outputs them to a multiplexer 104. Multiplexer 104 selects alternatively the outputs of first FIFO line memory 102 and second FIFO line memory 103 in accordance with the selection control signal applied to the selection control port (S) thereof and outputs the selected output as double scan data.

On the other hand, when using a double scan circuit in an image apparatus circuit, the circuit should be integrated into a single chip for easy application and cost reduction. For this, the double scan circuit should have a constitution suitable for integration, such as in the case of VLSI circuits. However, as shown in FIG. 1, in the conventional technology, the circuit for controlling FIFO line memories is complex and a large number of memory cells is required for incorporating FIFO-type line memories within a chip, which leads to a problem for VLSI implementation.

Meanwhile, U.S. Pat. No. 5,177,609 discloses an image processing system for performing a time-based compression of an image and sampling the compressed image at double speed. Also, U.S. Pat. No. 5,115,312 discloses a circuit for sequentially scanning an interpolated chrominance signal (or its luminance signal) and an original chrominance signal (or its luminance signal) at double speed, using line memories in the double scan circuit of a television.

SUMMARY OF THE INVENTION

It is an object of the present invention to provide a circuit for solving the above problems.

It is another object of the present invention to provide a double scan circuit for inserting a new scan line obtained by interpolating the interlaced scan signals between the original signal lines and then sequentially scanning, line by line, in order to prevent image quality deterioration in a large screen.

It is still another object of the present invention to provide a circuit for performing double scanning, using a general random access memory (RAM) chip.

To attain the above objects of the present invention, there is provided a double scan circuit comprising:

a first data generator for generating real line data;

a second data generator for generating interpolated line data by line-interpolating an interlaced scanning signal and;

a controller for generating a control signal for discriminating between the real line data and the interpolated line data every horizontal line period, a write clock having a predetermined frequency, and a read clock whose frequency is 2m times the frequency of the write clock;

a first data converter for converting n-bit real line data into 2n-bit real line data;

a second data converter for converting n-bit interpolated line data into 2n-bit interpolated line data;

a first memory for storing the converted real line data, and reading out the stored data in accordance with the read clock;

a second memory for storing the converted interpolated line data, and reading out the stored data in accordance with the write clock;

a memory controller for generating a read/write control signal for the first and second memories, a write address and a read address being 2m times the speed of that for the write address, in accordance with the real/interpolated line control signal and the write clock, for applying them to the first and second memories, and for generating a mixing control signal for mixing the original line data with the interpolated line data stored in the first and second memories for double scanning; and a double scan data generator for selecting one between the 2n-bit real line data and the 2n-bit interpolated line data in accordance with the mixing control signal and real/interpolated line control signal and for producing the selected one as n-bit double scan data.

BRIEF DESCRIPTION OF THE DRAWINGS

The above objects and advantages of the present invention will become more apparent by describing in detail a preferred embodiment thereof with reference to the attached drawings in which:

FIGS. 4A–4U constitute a timing diagram for the memory controller shown in FIG. 3.

DETAILED DESCRIPTION OF THE INVENTION

Figure 2:
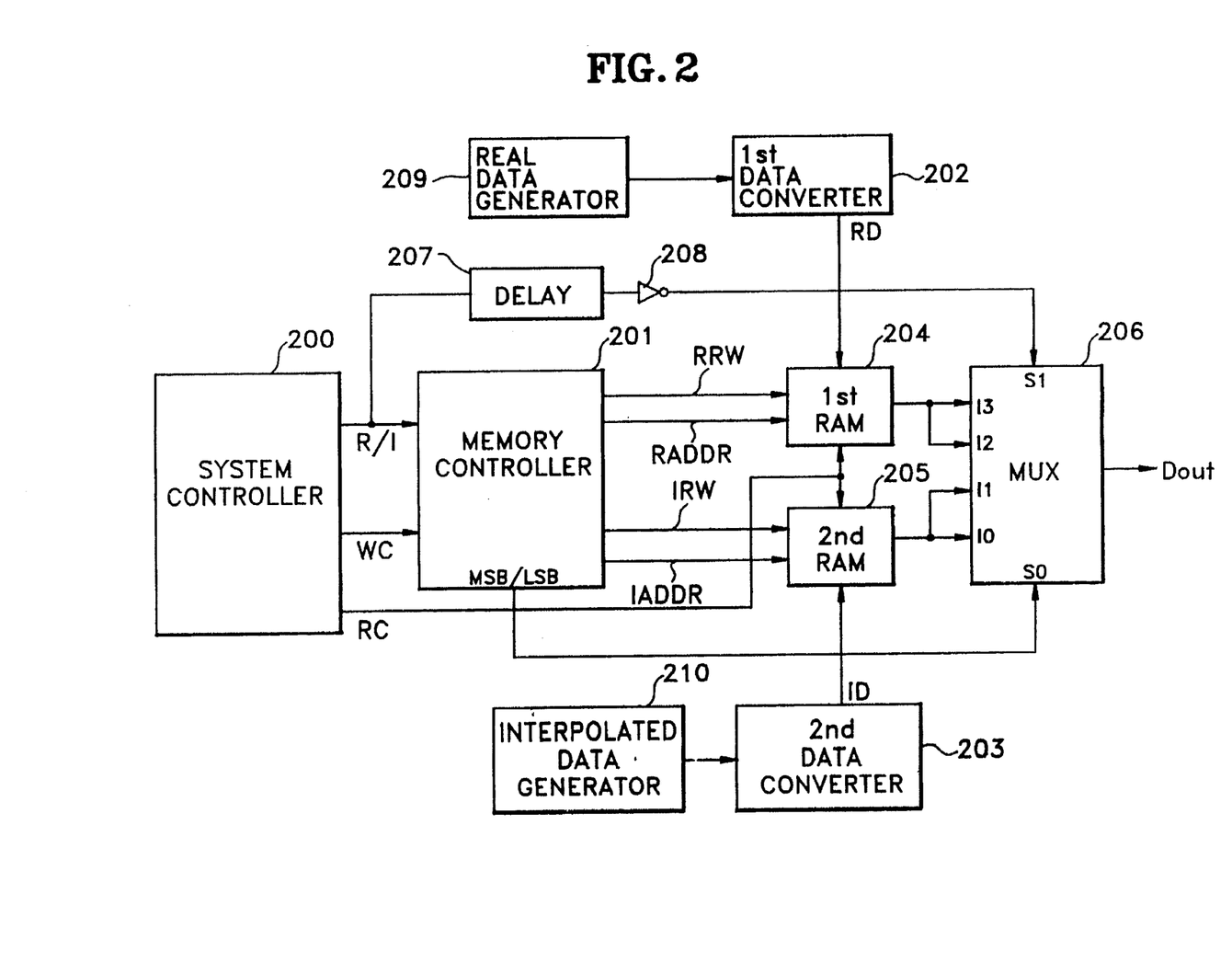
FIG. 2 is a circuit diagram of a double scan circuit according to one embodiment of the present invention.

In FIG. 2, a real/interpolated line control signal (R/I) and a write clock (WC) of a system controller 200 are connected to a memory controller 201. A first address output port (RADDR) and a first control signal output port (RRW) of memory controller 201 are coupled to a first RAM 204. A second address output port (IADDR) and a second control signal output port (IRW) of memory controller 201 are coupled to a second RAM 205.

The input of a first data converter 202 is coupled to the output of a real data generator 209, and an output port RD thereof is coupled to first RAM 204. The input of a second data converter 203 is coupled to the output of an interpolated data generator 210, and an output port ID thereof is coupled to second RAM 205. A read clock (RC) output port of system controller 200 is coupled to first and second RAMs 204 and 205.

In a double scan data generator 206 constituted by a multiplexer, first and second data input ports I0 and I1 thereof are coupled to second RAM 205, third and fourth data input ports I2 and I3 are coupled to first RAM 204, a first selection control port S0 is coupled to an MSB/LSB signal output port of memory controller 201, a second selection control port S1 is coupled via a delay 207 and an inverter 208, to the R/I output of system controller 200, and sequential data (Dout) is produced at double speed through an output port thereof.

The operation of the circuit shown in FIG. 2 is as follows.

Referring to FIG. 2, memory controller 201 is a block for generating memory control signals (IRW and RRW) and address signals (IADDR and RADDR) for controlling first and second RAMs 204 and 205 as double scan memories, and a selection control signal for controlling the selection of multiplexer 206. The detailed composition and operation of memory controller 201 will be explained later, referring to FIG. 3.

For the currently input original real line data (hereinafter called "real data") and interpolated line data (hereinafter called "interpolated data"), first and second data converters 202 and 203 convert the existing 8-bit data into 16-bit data for securing a sufficient timing margin (the timing margin for proper memory operation). The converted data of first data converter 202 is written into first RAM 204 by control signal RRW and address signal RADDR generated in memory controller 201, and the data written into first RAM 204 is read out. The converted data of second data converter 203 is written into second RAM 205 by control signal IRW and address signal IADDR generated in memory controller 201, and the data written into second RAM 205 is read out.

At this time, the write frequency is 7.16 MHz (2 fsc), which allows for memory processing such that no timing problems exist in the operation of first and second RAMs 204 and 205. In addition, the read speed of first and second RAMs 204 and 205 is made double the write speed by the control of memory controller 201, so that 16-bit data is read out from first and second RAMs 204 and 205 at the speed corresponding to 14.3 MHz (i.e., 4 fsc, or double the write frequency).

Also, in the embodiment of the present invention, the timing for RAM operation should be about 30 nanoseconds or more. For processing 8-bit data without any data conversion in first and second data converters 202 and 203, the read speed of first and second RAMs 204 and 205 is 8 fsc. (Here, since 8 fsc timing is shorter than 30 nanoseconds, the RAM cannot operate properly.) Accordingly, first and second data converters 202 and 203 convert the 8-bit real and interpolated data into 16-bit real and interpolated data, in order to maintain the minimum securable operating margin for RAMs 204 and 205.

The real/interpolated line control signal input through the R/I port to memory controller 201 is generated for every line (or 1 H) in the real video signal and is a signal for discriminating between the processing intervals of the real data and the interpolated data. The real/interpolated line control signal is input through a delay 207 and an inverter 208 to second selection control port S1 of multiplexer 206.

To convert an original 1 H period of a video signal from the interlacing scanning type into the sequential scanning type, multiplexer 206 must scan and output data of two lines per 1 H period. In other words, multiplexer 206 receives the second selection control signal and the first selection signal output from the MSB/LSB port of memory controller 201, and converts the 16-bit data read out from first and second RAMs 204 and 205 into 8-bit data, and then produces the double scan data.

Figure 3:
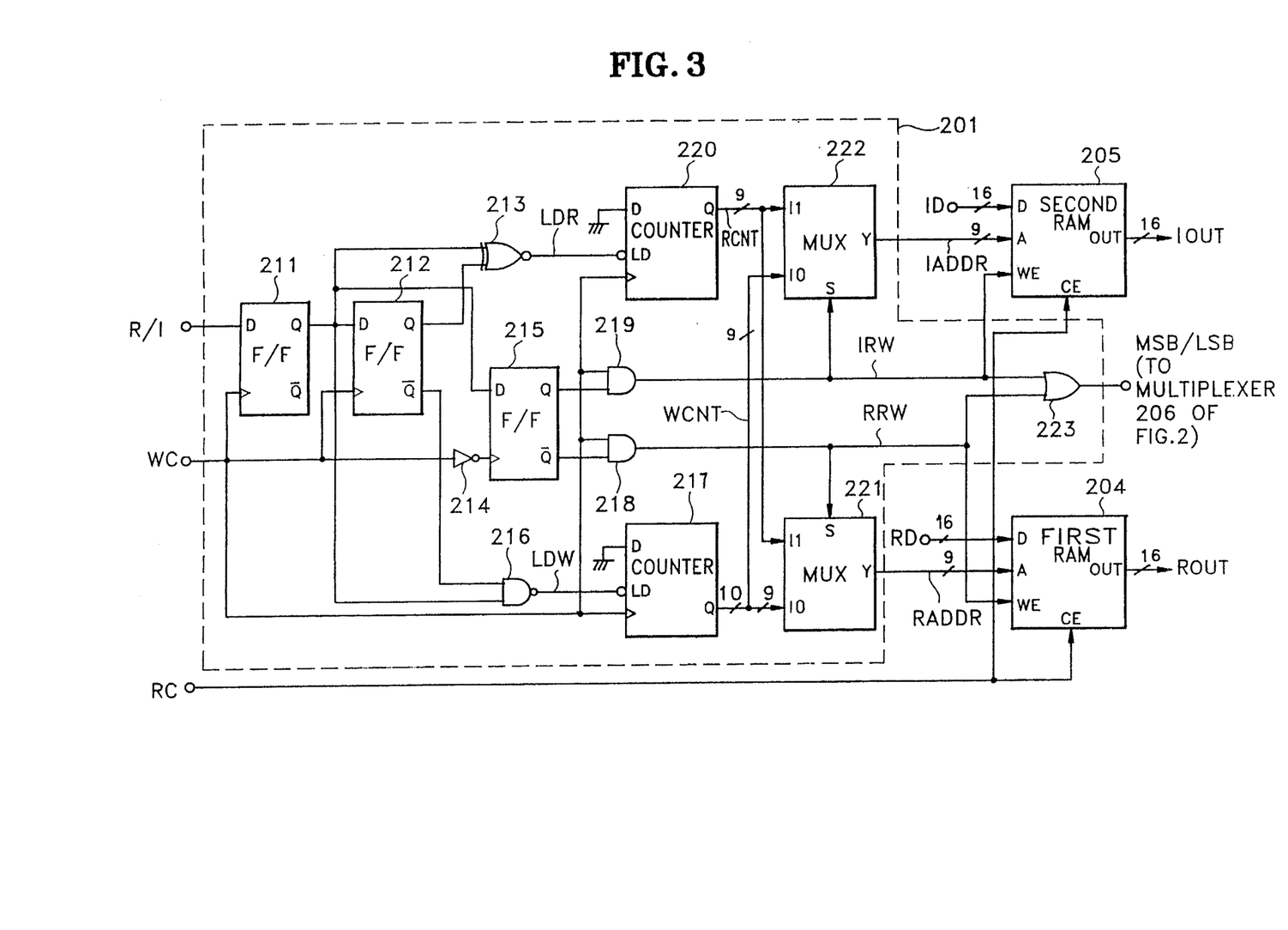
FIG. 3 is a detailed circuit diagram of the memory controller shown in FIG. 2.

FIG. 3 is a detailed circuit diagram of the memory controller 201 shown in FIG. 2.

In FIG. 3, the data input port of a first D flip-flop (F/F) 211 is coupled to the real/interpolated line control signal input port (R/I) of memory controller 201. The Q output of first D flip-flop 211 is coupled to the data inputs of second and third D flip-flops 212 and 215 and to a first input of each of an XNOR gate 213 and a NAND gate 216. The write clock port (WC) of memory controller 201 is coupled to the clock ports of first and second D flip-flops 211 and 212 and first and second counters 217 and 220, to a first input of each of first and second AND gates 219 and 220, and to the input of an inverter 214. A second input of XNOR gate 213 is coupled to the Q output of second D flip-flop 212 and the output thereof is coupled to the load (LD) control signal input of second counter 220. The second input of NAND gate 216 is coupled to the $\overline{Q}$ output of second D flip-flop 212 and the output thereof is coupled to the load control signal input of first counter 217. The clock input of third D flip-flop 215 is coupled to the output of inverter 214, the Q output thereof is coupled to the second input of second AND gate 219, and the $\overline{Q}$ output is coupled to the second input of first AND gate 218. The data inputs of first and second counters 217 and 220 are both coupled to ground, and their Q outputs are respectively coupled to the first (I0) and second (I1) selection input ports of first and second multiplexers 221 and 222. The selection control ports (S) of first and second multiplexers 221 and 222 are coupled to the outputs of first and second AND gates 218 and 219, respectively, and their outputs (Y) are coupled to the address input ports (A) of first and second RAMs 204 and 205, respectively. The inputs of an OR gate 223 are respectively coupled to the outputs of first and second AND gates 218 and 219, and the output thereof (MSB/LSB) is coupled to the first selection control port (S0) of multiplexer 206 shown in FIG. 2. The data input port (D) of first RAM 204 is coupled to the output port RD of first data converter 202 shown in FIG. 2, the address input port (A) is coupled to the output port (Y) of first multiplexer 221, the write enable signal input port (WE) thereof is coupled to the output of first AND gate 218, and the chip enable (CE) input is coupled to the read clock port (RC) of system controller 200. The data input port of second RAM 205 is coupled to the output port ID of second data converter 203 shown in FIG. 2, the write enable signal input port thereof is coupled to the output of second AND gate 219, the address input port (A) is coupled to the output port (Y) of second multiplexer 222 and the chip enable input is coupled to the read clock port (RC) of system controller 200.

The operation of memory controller 201 shown in FIG. 3 will be explained with reference to FIG. 2 and FIGS. 4A–4U.

Figure 4A:
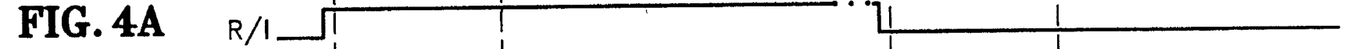
Figure 4B:
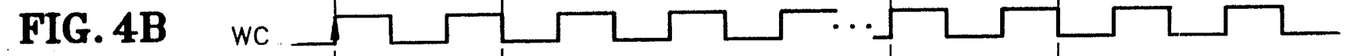
Figure 4C:
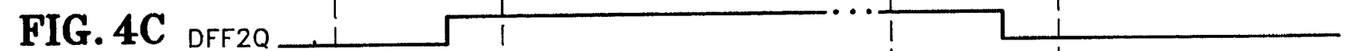

FIG. 4A shows the real/interpolated line control signal input through input port R/I of FIG. 3. This real/interpolated line control signal is latched in first D flip-flop 211 in accordance with the clock input (FIG. 4B) through the write clock port WC of memory controller 201, and the latched signal is output to XNOR gate 213, NAND gate 216, and second and third D flip-flops 212 and 213.

Figure 4D:
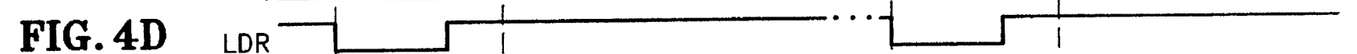

XNOR gate 213 receives the outputs of first and second D flip-flops 211 and 212 (FIG. 4C) and produces the signal LDR shown in FIG. 4D which is output to the load input of second counter 220. The LDR signal is reset at every transition of the real/interpolated line control signal (shown in FIG. 4A) input through the R/I port, which corresponds to every ½ horizontal line period (0.5 H) of a video signal.

Figure 4E:
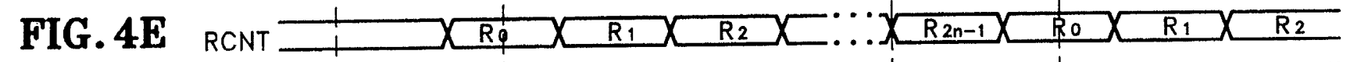
Figure 4F:
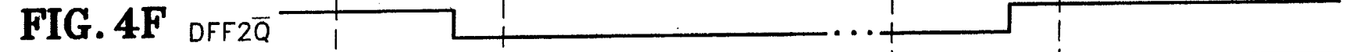
Figure 4G:
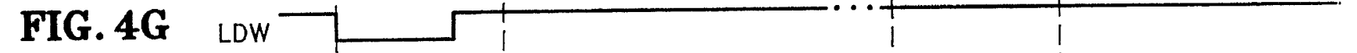

Second counter 220 used for generating a read address counts the pulses of the write clock (FIG. 4B) in accordance with the load control signal LDR (FIG. 4D), and produces a 9-bit read address counting data RCNT, as shown in FIG. 4E, which can represent up to 512 addresses.

The NAND gate 216 receives the $\bar{Q}$ output, DFF2$\bar{Q}$ (shown in FIG. 4F) of second D flip-flop 212 and the Q output of first D flip-flop 211, and thereby produces the load control signal LDW (FIG. 4G) for first counter 217. The LDW signal is reset every horizontal line period (1 H).

Figure 4H:
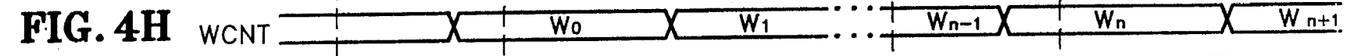
Figure 4I:
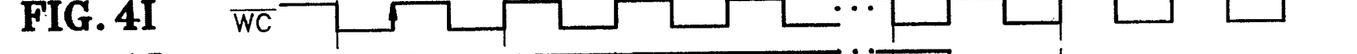
Figure 4J:
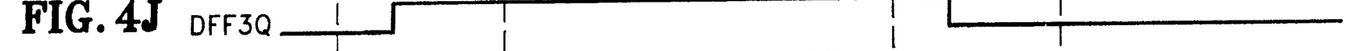

Since the write speed is half of the read speed, first counter 217 generates write addresses by using only the upper 9-bits of its 10-bit output. Here, first counter 217 counts the pulses of the write clock (FIG. 4B) in accordance with the load control signal LDW (FIG. 4G) and produces the write address counting data WCNT, as shown in FIG. 4H.

Third D flip-flop 215 latches the real/interpolated line control signal latched in first D flip-flop 211, in accordance with the inverted write clock (shown in FIG. 4I) output from inverter 214.

Figure 4K:
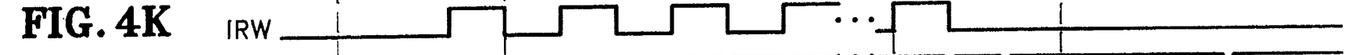
Figure 4L:
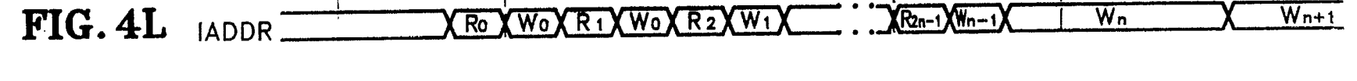

Second AND gate 219 performs a logical AND operation on the output (DFF3Q shown in FIG. 4J) of third D flip-flop 215 and the write clock shown in FIG. 4B, and applies the signal (IRW) shown in FIG. 4K to the selection control port of second multiplexer 222 and the write enable signal input port of second RAM 205.

Figures 4M, 4N, 4O, 4P:
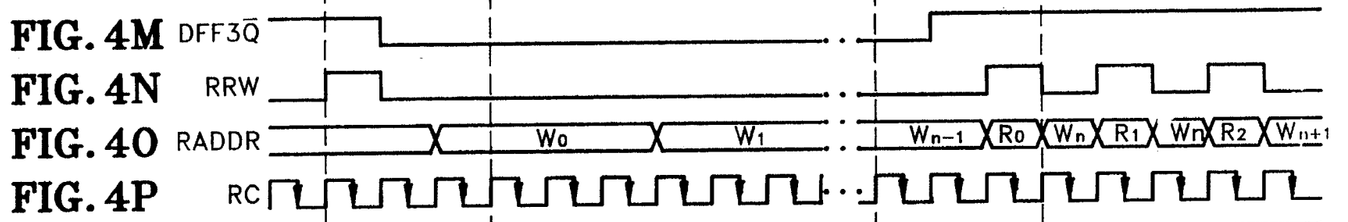

Also, first AND gate 218 performs a logical AND operation on the inverted output (DFF3$\bar{Q}$ shown in FIG. 4M) of third D flip-flop 215 and the write clock shown in FIG. 4B, and applies the signal (RRW) shown in FIG. 4N to the selection control port of first multiplexer 221 and write enable signal input port of first RAM 204.

Therefore, second AND gate 219 produces pulses (shown in FIG. 4K) only when the real/interpolated line control signal (shown in FIG. 4A) is high, and applies this IRW signal to the selection port of second multiplexer 222. First AND gate 218 produces pulses (shown in FIG. 4N) only when the real/interpolated line control signal (shown in FIG. 4A) is low, and applies this RRW signal to the selection port of first multiplexer 221. Also, the outputs of first and second AND gates 218 and 219 are applied to first and second RAMs 204 and 205 as write enable signals, respectively.

First and second multiplexers 221 and 222 select one between the read address and the write address generated from first and second counters 217 and 220, in accordance with selection signals RRW and IRW generated from first and second AND gates 218 and 219, respectively, and apply the selected one to first and second RAMs 204 and 205. At this time, the data written into first and second RAMs 204 and 205 are the real data and the interpolated data, respectively, which are converted by first and second data converters 202 and 203 shown in FIG. 2, respectively.

The read/write operation of the interpolated data output from second data converter 203 from/to second RAM 205 occurs when the real/interpolated line control signal (shown in FIG. 4A) is high.

When the logic high state of the output (IRW shown in FIG. 4K) of second AND gate 219 is input to the selection control port of second multiplexer 222 and the write enable signal input port of second RAM 205, second RAM 205 is write-disabled. At this time, second multiplexer 222 selects the read address data (R0–$R_{2n-1}$) of second counter 220, which is shown in FIG. 4L and input through second selection input port I1, and applies the selected one to second RAM 205, to thereby read out the address data stored in second RAM 205 as 16-bit interpolated data IOUT.

When a logic low state of output (shown in FIG. 4K) of second AND gate 219 is input to the selection control port S of second multiplexer 222 and the write enable signal port WE of second RAM 205, second multiplexer 222 selects the write address data ($W_0$–$W_{2n-1}$) of first counter 217 shown in FIG. 4L, and applies the selected one to second RAM 205, so that second RAM 205 performs a writing operation.

Accordingly, if second multiplexer 222 selects the write address and the read address input through first selection input port I0 and second selection input port I1 and applies the selected one to second RAM 205, the interpolated data is sequentially written to or read out from second RAM 205.

Writing or reading out the real data output from first data converter 202 to or from first RAM 204 is done only when the real/interpolated line control signal (shown in FIG. 4A) is low.

At this time, when the logic high state of the output (shown in FIG. 4N) of first AND gate 218 is input to the selection control input of first multiplexer 221 and the write enable signal input port of first RAM 204, first RAM 204 is write-disabled, and the first multiplexer 221 selects the read address data ($R_0$–$R_{2n-1}$) of second counter 220, which is shown in FIG. 4O and is input through second selection input port I1, and applies the selected one to first RAM 204, so that the first RAM 204 performs a reading out operation.

When a logic low state of the output (shown in FIG. 4N) of first AND gate 218 is input to the selection control port of first multiplexer 221 and the write enable signal port of first RAM 204, first multiplexer 221 selects the write address data ($W_n$–$W_{2n-1}$) of first counter 217 shown in FIG. 4O and applies the selected one to first RAM 204, so that first RAM 204 performs a writing operation. Accordingly, first RAM 204 sequentially writes or reads out the real data in accordance with write/read addresses selected in first multiplexer 221.

The address input to second RAM 205 is as shown in FIG. 4L and the address input to first RAM 204 is as shown in FIG. 4O. For second RAM 205, when the real/interpolated line control signal (shown in FIG. 4A) is high, read/write operations are interchangeably performed, and when low, only the write operation is performed. Conversely, for first RAM 204, when the real/interpolated line control signal (shown in FIG. 4A) is high, a write operation is performed, and when low, the read/write operations are interchangeably performed.

On the other hand, the read operation according to the read address input in the first and second RAMs 204 and 205 receiving read/write address for interpolation data and read/write address for the real data which are selected and output by first and second multiplexers 221 and 222, is controlled by the read clock input (FIG. 4P) to the chip enable ports of first and second RAM 204 and 205.

At this time, the period of the read clock (shown in FIG. 4P) input to chip enable port of first and second RAMs 204 and 205 is shorter than that of the write clock (shown in FIG. 4B).

First and second RAMs 204 and 205 read out real data or interpolated data in synchronization with the falling edge of the read clock (shown in FIG. 4P) which is input to the memory chip enable ports, when the write enable signals IRW and RRW shown in FIGS. 4K and 4N goes "high" after being "low" for 0.5 H period.

Figures 4Q, 4R:
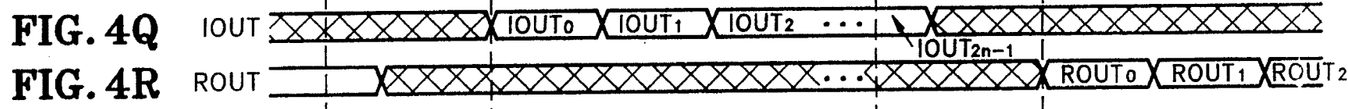

Therefore, the output of second RAM 205 is as shown in FIG. 4Q, and the output of first RAM 204 is as shown in FIG. 4R. The outputs of first and second RAMs 204 and 205 are applied to multiplexer 206 shown in FIG. 2.

Figure 4S:
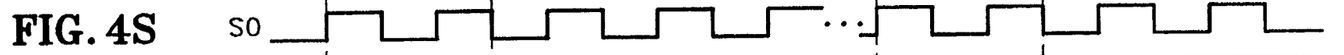
Figures 4T, 4U:
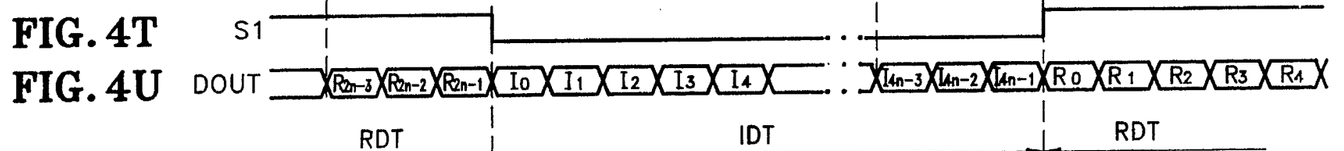

OR gate 223 performs a logical OR operation on the outputs of first and second RAMs 204 and 205 and applies the signal as shown in FIG. 4S to first selection control port S0 of multiplexer 206.

The output (shown in FIG. 4S) of this OR gate 223 is used for dividing the data output from first and second RAMs 204 and 205 into the upper and lower eight bits.

Real/interpolated line control signal (shown in FIG. 4A) is delayed by delay 207 shown in FIG. 2, and the signal (shown in FIG. 4T) which has been inverted by inverter 208 is applied to second selection port S1 of multiplexer 206.

Multiplexer 206 makes a selection in accordance with the states of the input selection signals. In more detail, when the second selection control signal is "low" the interpolated data is selected and alternately applied to the first or second selection input ports I0 or I1 in accordance with the first selection control signal which is shown in FIG. 4S. When the second selection control signal shown in FIG. 4T is "high", the real data is selected and alternately applied to the third or fourth selection input ports I2 or I3 in accordance with the first selection control signal which is shown in FIG. 4S. As a result, 8-bit double scan data as shown in FIG. 4U is generated. In other words, discrimination is made between the period for the real data output RDT and the period for interpolated data output IDT.

In addition, during 1 H period of a video signal, 910 pixels can be scanned with a 14.3 MHz clock, so 910 or more address regions are required for the real 8-bit data. Since 8-bit data is converted into 16-bit data due to the read/write timing restriction of memory (corresponding to first and second RAMs 204 and 205), the number of required address regions for first and second RAMs 204 and 205 may be reduced to 455, so the number of bits for a read/write address may be set to nine. First and second RAMs 204 and 205 each can be implemented by 455×16 bits of RAM memory.

The present invention can be applied to a monitor for a large screen television or an LCD display.

As described above, the present invention facilitates VLSI implementation compared with the conventional double scan circuit using FIFO-type memories. Also, in the method for controlling RAM, the read/write control is not independently made for the real and the interpolated line data, but it is commonly made for the real and the interpolated line data, which results in simplifying the circuit. In addition, according to the present invention, one chip implementation of an Application Specific Integrated Circuit (ASIC) can be easily realized, by designing such that the required operating frequency of the memory is reduced to half of the ordinary one, to reduce the power consumption.

What is claimed is:

1. A double scan circuit comprising:

first data generating means for generating n-bit real line data;

second data generating means for generating n-bit interpolated line data by line-interpolating an interlace scan signal;

control means for generating a control signal for discriminating between the real line data and the interpolated line data every horizontal line period, a write clock signal having a predetermined frequency, and a read clock signal whose frequency is 2m times the frequency of the write clock signal, wherein m is an integer greater than one;

first data converting means for converting the n-bit real line data into 2n-bit real data;

second data converting means for converting the n-bit interpolated line data into 2n-bit interpolated line data;

first memory means in which the converted real line data is stored, for reading out the stored data in accordance with the read clock signal;

second memory means in which the converted interpolated line data is stored, for reading out the stored data in accordance with the write clock signal;

memory controlling means for generating a write/read control signal of said first and second memory means, a write address and a read address at 2m times the speed of that for the write address, in accordance with the real/interpolated line control signal and the write clock signal, for applying them to said first and second memory means, and for generating a mixing control signal for mixing the real line data with the interpolated line data stored in said first and second memory means for double scanning; and double scan data generating means for selecting one between the 2n-bit real line data and the 2n-bit interpolated line data in accordance with the mixing control signal and real/interpolated line control signal and for producing the selected one as n-bit double scan data.

2. A double scan circuit according to claim 1, wherein said first and second memory means are constituted by random access memories (RAMs).

3. A double scan circuit according to claim 1, wherein said memory controller comprises:

first control signal generating means for receiving the real/interpolated line control signal and for generating a first control signal representing processing mode periods of the real/interpolated line data, a second control signal whose period is equal to one horizontal line period, and a third control signal whose period is equal to one half horizontal line period;

write address signal generating means for generating a write address signal in accordance with the second control signal;

read address signal generating means for generating a read address signal whose speed is double that of the write address signal in accordance with the third control signal;

second control signal generating means for producing a pulse signal representing the real line data processing period as a first selection control signal and the write/read control signal of said first memory means in accordance with the first control signal, and for producing a pulse signal representing the interpolated line data processing period as a second selection control signal and the write/read control signal of said second memory means in accordance with the third control signal;

selecting means for selecting one between the write address signal and the read address signal which are generated from said write address generating means and said read address generating means, respectively, in accordance with the first and the second selection control signal and applying the selected one to said first and second memory means; and mixing control signal generating means for generating the mixing control signal using the first and the second selection control signals such that the 2n-bit data is divided into upper n-bit data and lower n-bit data and then the divided n-bit data are mixed in said double scan data generating means.

4. A double scan circuit according to claim 3, wherein said first control signal generating means comprises:

first latching means for latching the real/interpolated line control signal in synchronization with the write clock signal, and for producing the first control signal representing the real/interpolated line data processing periods;

first load control signal generating means for supplying the second control signal whose period is equal to one horizontal line period to said write address generating means, using an output of said first latching means; and second load control signal generating means for supplying the third control signal whose period is equal to one half the horizontal line period to said read address generating means, using the output of said first latching means.

5. A double scan circuit according to claim 4, wherein said second control signal generating means comprises:

an inverter for inverting the write clock signal;

second latching means for latching the third control signal in accordance with an output of said inverter, and applying the latched signal to said second control signal generating means;

a first logic element for performing a logical AND operation on the read clock signal and an output of said second latching means, and producing a logic result as the first selection control signal of said first selecting means and the write/read control signal of said first memory means; and a second logic element for performing a logical AND operation on the read clock signal and an inverted output of said second latching means, and producing the logic result as the second selection control signal of said second selecting means and the write/read control signal of said second memory means.

6. A double scan circuit according to claim 3, wherein said write address signal generating means and said read address signal generating means generate the read address and the write address of said first and second memory means, irrespective of the real/interpolated line data processing mode.

7. A double scan circuit according to claim 3, wherein when the real/interpolated line control signal is a first logic state, said second memory means alternately perform reading/writing in accordance with the write clock signal, and when the real/interpolated line control signal is a second logic state, said second memory means perform only writing, and conversely, when the real/interpolated line control signal is at a first logic state, said first memory means perform writing in accordance with the write clock signal, and when the real/interpolated line control signal is at a second logic state, said first memory means alternately perform read/write operations.

8. A double scan circuit comprising:

a first data converter for converting n-bit real line data into 2n-bit real line data;

a second data converter for converting n-bit interpolated line data obtained by line interpolation into 2n-bit interpolated line data;

a first RAM in which the 2n-bit interpolated line data is stored;

a second RAM in which the 2n-bit real line data is stored;

a first counter for generating a write address;

a second counter for generating a read address whose speed is a predetermined number of times that of the write address;

address supplying control means for supplying the write address and the read address which are respectively generated from said first and second counters to said first and second RAMs, in accordance with a control signal representing a real data processing period during one half of one horizontal period and representing an interpolated data processing period during the other half of one horizontal period; and outputting means for selecting one between the 2n-bit interpolated line data and the 2n-bit real line data which are read out from said first and second RAMs and producing the selected one as n-bit double scan data.

9. A double scan circuit according to claim 8, wherein said first counter and said second counter generate the read address and the write address of said first and second RAMs, irrespective of the real line/interpolated line data processing mode.

10. A double scan circuit according to claim 8, wherein said address supplying control means controls the supplying of the write/read addresses such that, when the control signal is a first logic state, said second RAM alternately performs reading/writing in accordance with the write clock signal, and when the control signal is a second logic state, said second RAM performs only writing, and conversely, when the control signal is at a first logic state, said first RAM performs writing in accordance with the write clock, and when the control signal is at a second logic state, said first RAM alternately performs read/write operations.

* * * * *